United States Patent
Watanabe et al.

(10) Patent No.: US 6,805,081 B2
(45) Date of Patent: Oct. 19, 2004

(54) VALVE TIMING CONTROL DEVICE FOR INTERNAL COMBUSTION ENGINE

(75) Inventors: Masahiko Watanabe, Yokohama (JP); Tamotsu Todo, Kanagawa (JP); Kazuhiko Takayanagi, Kanagawa (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/455,531

(22) Filed: Jun. 6, 2003

(65) Prior Publication Data

US 2003/0226534 A1 Dec. 11, 2003

(30) Foreign Application Priority Data

Jun. 7, 2002 (JP) ........................................ 2002-166411

(51) Int. Cl.[7] ................................................ F01L 1/34
(52) U.S. Cl. ................................ 123/90.17; 123/90.11; 123/90.15; 123/90.31; 464/1; 464/2; 464/29; 464/160; 310/156.03
(58) Field of Search ........................... 123/90.17, 90.11, 123/90.15–90.18, 90.31; 464/1, 2, 29, 160; 310/156.03, DIG. 2

(56) References Cited

U.S. PATENT DOCUMENTS

| | | | | |
|---|---|---|---|---|
| 5,172,661 A | * | 12/1992 | Brune et al. ............. | 123/90.17 |
| 6,257,380 B1 | * | 7/2001 | Duncan ...................... | 188/162 |
| 6,328,008 B1 | | 12/2001 | Io ............................. | 123/90.17 |
| 6,390,045 B1 | * | 5/2002 | Mae et al. ............... | 123/90.17 |
| 6,502,537 B2 | * | 1/2003 | Todo et al. .............. | 123/90.17 |
| 6,510,826 B2 | * | 1/2003 | Watanabe ................ | 123/90.17 |

FOREIGN PATENT DOCUMENTS

| JP | 9-250309 A | 9/1997 |
|---|---|---|
| JP | 2001-107712 A | 4/2001 |

OTHER PUBLICATIONS

Kikai Sekkei (Machine Designing), "Hysteresis Clutch and Brake", Nikkan Kogyou Shinbun Company of Japan, vol. 38, No. 4, Feb. 1994, pp. 49–53.

* cited by examiner

Primary Examiner—Thomas Denion
Assistant Examiner—Kyle M. Riddle
(74) Attorney, Agent, or Firm—Foley & Lardner LLP

(57) ABSTRACT

A valve timing control device for an internal combustion engine, comprises a drive rotary member rotated by a crankshaft of the engine, a driven rotary member to rotate a camshaft of the engine upon rotation of the drive rotary member; a rotational phase control mechanism having an intermediate rotary member rotated relative to the drive and driven rotary members to cause relative rotation between the drive and driven rotary members and an braking mechanism having a hysteresis brake that generates a braking force to cause the intermediate rotary member to rotate relative to the drive and driven rotary members.

18 Claims, 14 Drawing Sheets

VALVE TIMING CONTROL DEVICE FOR INTERNAL COMBUSTION ENGINE

BACKGROUND OF THE INVENTION

The present invention relates to a valve timing control device for an internal combustion engine, which controls the timing of opening and closing an intake valve and/or an exhaust valve of the engine according to an engine operating condition.

Japanese Laid-Open Patent Publication No. 9-250309 discloses a valve timing control device that employs an electromagnetic brake to generate a braking force so as to actuate a rotational phase control mechanism and thereby control the rotational phase of an engine camshaft relative to an engine crankshaft.

SUMMARY OF THE INVENTION

The above electromagnetic brake has a braking member brought into friction contact with a rotary member of the rotational phase control mechanism so that the braking force is transferred from the electromagnet brake to the rotational phase control mechanism through the contact between the braking member and the rotary member. However, the braking member and the rotary member eventually wear at their contact surfaces even under normal use. Due to the frictional wear of these members, there arises a problem that the electromagnetic brake may not be able to impart a sufficient braking force to stably actuate the rotational phase control mechanism over the long-term service of the device.

In order to solve such a problem, it is conceivable to substitute a so-called "non-contact brake" for the above electromagnetic brake. One example of the non-contact brake is an eddy-current brake disclosed in Japanese Laid-Open Patent Publication No. 2001-107712. The eddy-current brake develops a magnetic field across a rotating member upon energization of an electromagnetic coil, thereby inducing an eddy current in the rotating member. With the interaction of the eddy current with the magnetic field, the rotating member becomes subjected to a braking force. The braking force generated by the eddy-current brake depends on the amount of eddy current caused in the rotating member, i.e., the rotation speed of the rotating member relative to the magnetic field.

In the case of using such an eddy-current brake in the valve timing control device to actuate the rotational phase control mechanism, however, there arise another problem that, when the rotary member of the rotational phase control mechanism rotates at a low speed, the braking force cannot be generated sufficiently. The valve timing control device thus becomes slow in valve timing control response and, at the same time, cannot stably hold the adjusted rotational phase between the crankshaft and the camshaft under the influence of an alternating torque of the camshaft (i.e. a variable torque caused by the counterforce between a cam profile and a valve spring). For the reasons above, the actual use of the eddy-current brake in the valve timing control device to actuate the rotational phase control mechanism is difficult.

It is therefore an object of the present invention to provide a valve timing control device for an internal combustion engine, which employs a non-contact brake to actuate a rotational phase control mechanism for improvement of durability, without slowing down its valve timing control response and without failing to hold the rotational phase of an engine camshaft relative to an engine crankshaft.

According to one aspect of the invention, there is provided a valve timing control device for an internal combustion engine, comprising: a drive rotary member rotated by a crankshaft of the engine; a driven rotary member to rotate a camshaft of the engine upon rotation of the drive rotary member; a rotational phase control mechanism having an intermediate rotary member rotated relative to the drive and driven rotary members to cause relative rotation between the drive and driven rotary members; and a braking mechanism having a hysteresis brake that generates a braking force to cause the intermediate rotary member to rotate relative to the drive and driven rotary members.

According to another aspect of the invention, there is provided a valve timing control device for an internal combustion engine, comprising: a drive rotary member rotated by a crankshaft of the engine; a driven rotary member to rotate a camshaft of the engine; an intermediate rotary member rotated relative to the drive and driven rotary members to cause relative rotation between the drive and driven rotary members; biasing means for biasing the intermediate rotary member in a given rotation direction; a hysteresis brake that selectively applies a braking force to the intermediate rotary member to force the intermediate rotary member in a direction opposite to the given rotation direction.

The other objects and features of the invention will become understood from the following description with reference to the accompanying drawings.

DESCRIPTION OF THE EMBODIMENTS

Figure 1:
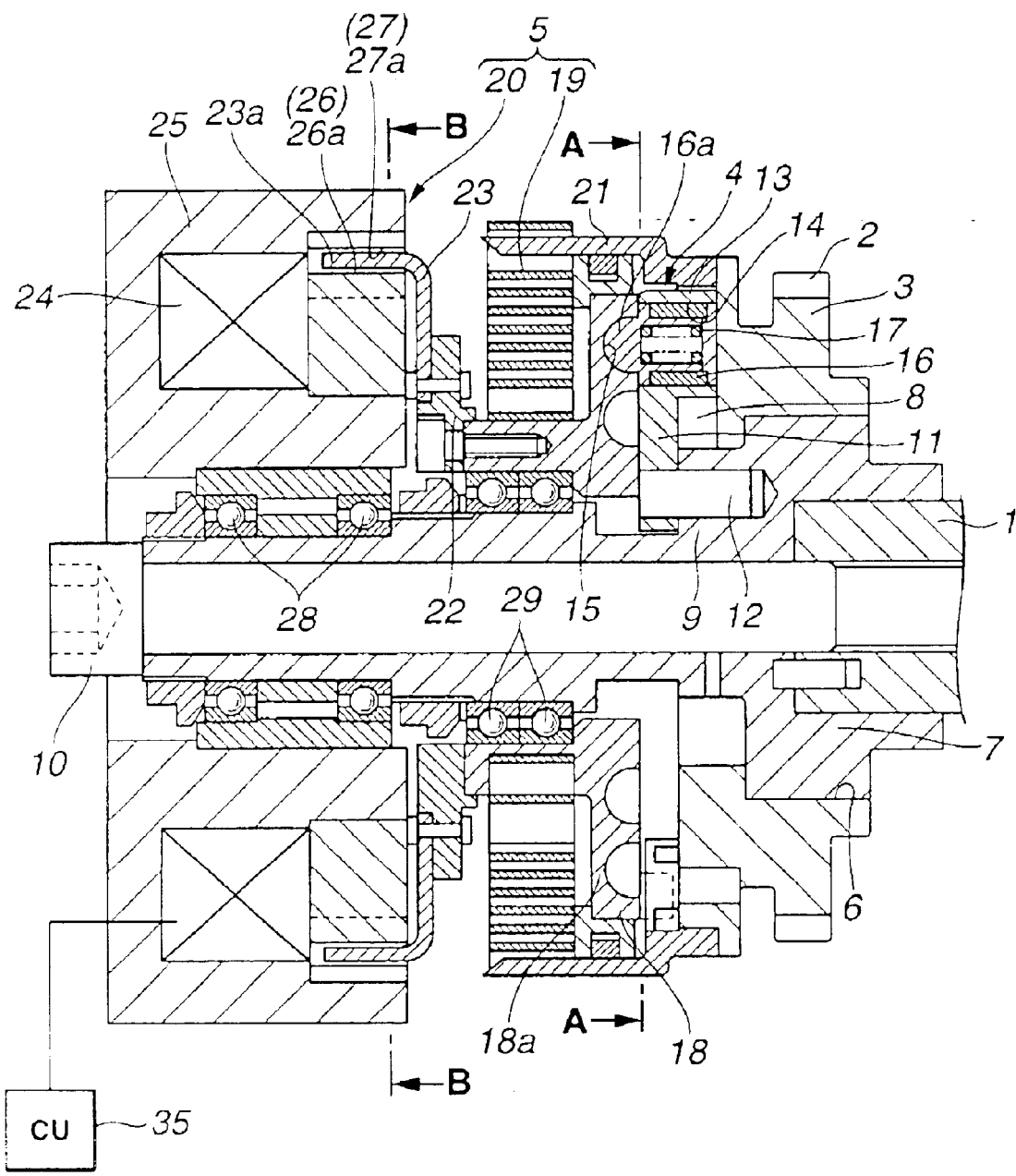
FIG. 1 is a sectional view of a valve timing control device according to a first embodiment of the present invention.

The present invention will be explained below with reference to the drawings. In the following description, the terms "front" and "rear" are used for purposes of locating one element relative to another and are not to be construed as limiting terms. Further, like parts and portion are designated by like reference numerals to omit repeated descriptions thereof.

Firstly, a first embodiment of the present invention will be explained with reference to FIGS. 1 to 8.

A valve timing control device of the first embodiment is to be mounted on a cylinder head of an internal combustion engine so as to control the timing of opening and closing an intake valve of the engine according to an engine operating condition, although it can be applied to control the timing of opening and closing an exhaust valve of the engine.

As shown in FIG. 1, the valve timing control device of the first embodiment comprises a camshaft 1 rotatably supported on the cylinder head for operation of the intake valve, a ring-shaped drive rotary member 3 having at an outer periphery thereof a sprocket 2 linked to an engine crankshaft (not shown) via a timing chain (not shown) so as to be rotated by the crankshaft, a cylindrical driven rotary member 7 fitted onto a front end of the camshaft 1 by a bolt 10 to rotate the camshaft 1 upon rotation of the drive rotary member 3, a rotational phase control mechanism 4 that controls a relative rotational phase between the drive and driven rotary members 3 and 7, and an actuation mechanism (as a braking mechanism) 5 that actuates the rotational phase control mechanism 4. Alternatively, the driven rotary member 7 may be an integral part of the camshaft 1. A VCT cover (not shown) is attached to the cylinder head and cylinder head cover to accommodate therein the rotational phase control mechanism 4 and the actuation mechanism 5.

The drive and driven rotary members 3 and 7 are arranged concentrically so that the rotary members 3 and 7 can rotate relative to each other about a given axis. The drive rotary member 3 has an axially short cylindrical portion through which a stepped hole 6 is formed, and the driven rotary member 7 has at a position axially corresponding to the front end of the camshaft 1 a flange portion engaged in the stepped hole 6 so as to allow relative rotation between the drive and driven rotary members 3 and 7. A cylindrical part 21 is fixed to a front side of the drive rotary member 3 so that the cylindrical part 21 can rotate together with the drive rotary member 3.

The rotational phase control mechanism 4 comprises an intermediate rotary member 18 having a cylindrical base portion and a flange portion 18a formed at a rear end of the base portion. The intermediate rotary member 18 is supported around the driven rotary member 7 by bearings 29 so that the intermediate rotary member 18 can rotate relative to the drive and driven rotary members 3 and 7 about the given axis upon receipt of an actuation force from the actuation mechanism 5, thereby causing relative rotation between the drive and driven rotary members 3 and 7.

The rotational phase control mechanism 4 further comprises a radial guide, a spiral guide, a movable part and a link to adjust the rotational phase between the drive and driven rotary members 3 and 7 upon rotation of the intermediate rotary member 18.

Figure 2:
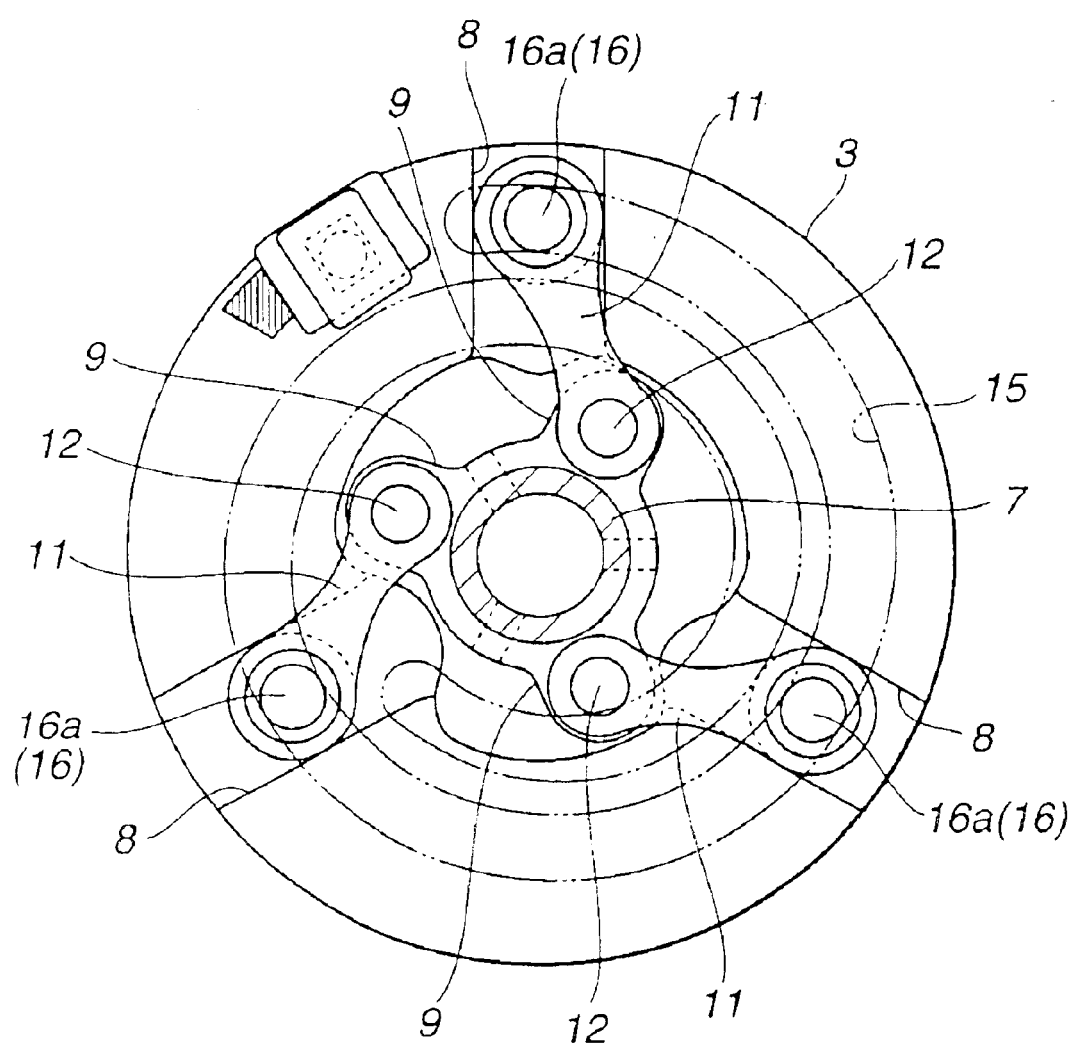
FIG. 2 is a sectional view of the valve timing control device, when taken along a line A—A of FIG. 1, under the condition that the rotational phase between drive and driven rotary members is shifted to a most-retarded phase position.

The radial guide includes radial guide grooves 8 formed in either one of the drive and driven rotary members 3 and 7. In the first embodiment, three radial guide grooves 8 are formed in a front side of the drive rotary member 3. Each guide groove 8 has a pair of parallel, opposed walls that extend nearly radially of the drive rotary member 3, as shown in FIG. 2.

The spiral guide includes a concentric-spiral guide groove 15 formed in a rear surface of the flange portion 18a of the intermediate rotary member 18. As shown in FIGS. 1 and 2, the guide groove 15 is semi-circular in cross section and-shaped to gradually reduce its spiral radius along a direction of rotation of the drive rotary member 3.

The movable part has sliding elements slidably engaged with the radial guide and the spiral guide, respectively. In the first embodiment, the movable part includes three sets of pins 13 and 16 and coil springs 17. Each of the pins 13 is formed into a column-shaped protrusion and slidably engaged in the guide groove 8. Each of pins 16 has a semi-spherical protrusion 16a slidably engaged in the guide groove 15 and is held under a tension by the spring 17. When the intermediate rotary member 18 is rotated in a retarding direction with respect to the drive rotary member 3, the pins 13 and 16 slide in and along the guide grooves 8 and 15, respectively, to guide the movable part in a radially inward direction. On the other hand, the pins 13 and 16 slide in and along the guide grooves 8 and 15 to guide the movable part in a radially outward direction, when the intermediate rotary member 18 is rotated in an advancing direction with respect to the drive rotary member 3.

The link includes link levers 9 and link arms 11 so as to link the movable part to the other of the drive and driven rotary members 3 and 7 and thereby adjust the rotational phase between the drive and driven rotary members 3 and 7 by a degree corresponding to the radial movement of the movable part. In the first embodiment, the link includes three sets of link levers 9 and link arms 11. Each lever 9 is formed integral with the driven rotary member 7 so as to extend radially outwardly at a position away from the given axis on the front side of the flange portion of the driven rotary member 7. Each of the link arms 11 is disposed between the drive rotary member 3 and the intermediate rotary member 18, and has two ends: an inner end pivotally fixed to the lever 9 by a pin 12 and an outer end linked to the pins 13 and 16. The pin 13 is formed integral with a rear side of the outer end of the link arm 11. Further, a hole 14 is formed in a front side of the outer end of the link arm 11 so that the pin 16 is held in the hole 14 together with the spring 17.

The actuation mechanism 5 comprises a spiral spring 19 that biases the intermediate rotary member 18 constantly in the direction of rotation of the drive rotary member 3, and a hysteresis brake 20 that selectively generates a braking force against a tension of the spring 19 to force the intermediate rotary member 18 in the reverse direction to the rotation of the drive rotary member 3. The actuation mechanism 5 allows the hysteresis brake 20 to adjust its braking force as appropriate according to the engine operating condition, thereby causing the intermediate rotary member 18 to rotate relative to the drive and driven rotary members 3 and 7 or locking the intermediate rotary member 18.

The spring 19 is arranged on the front side of the flange portion 18a of the intermediate rotary member 18, and has an inner end connected to the base portion of the intermediate rotary member 18 and an outer end connected to the cylindrical part 21.

Figure 3:
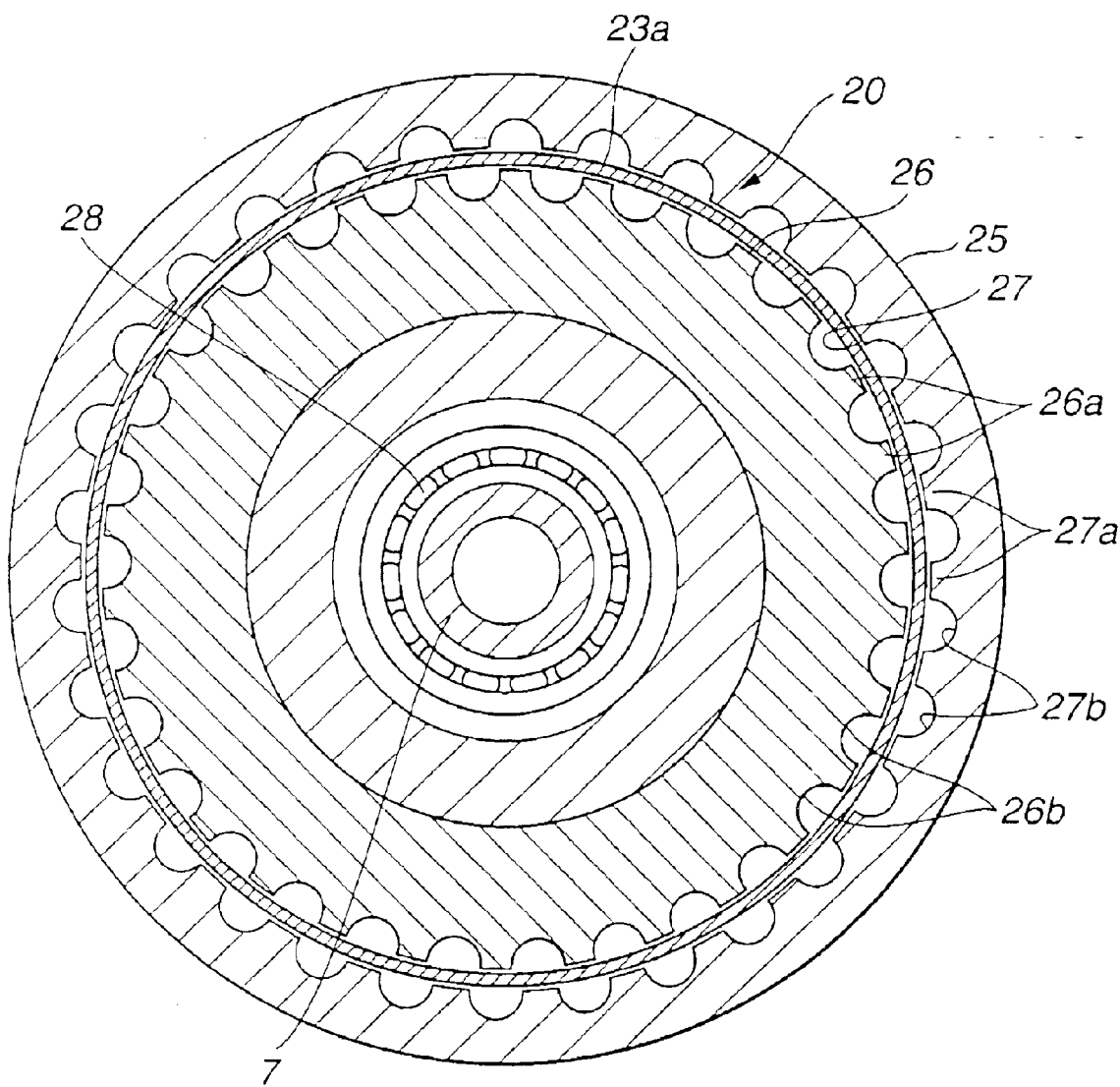
FIG. 3 is a sectional view of the valve timing control device, when taken along a line B—B of FIG. 1.

The hysteresis brake 20 comprises a hysteresis ring (as a first member) 23 having a hysteresis portion 23a with a magnetic hysteresis characteristic, an electromagnetic coil (as a magnetic-field control unit) 24 to control a magnetic field, and a coil yoke (as a second member) 25 having a magnetic portion from which the magnetic field is generated across the hysteresis portion 23a, as shown in FIGS. 1 to 3. The coil 24 and the coil yoke 25 are held unrotatably by the VCT cover, and the hysteresis ring 23 is movable relative to the coil 24 and the coil yoke 25 to impart a braking force to the hysteresis portion 23a due to the magnetic hysteresis characteristic when the hysteresis portion 23a moves through the magnetic field. A controller 35 is provided to control the energization of the coil 24 according to the engine operating condition.

Figure 5:
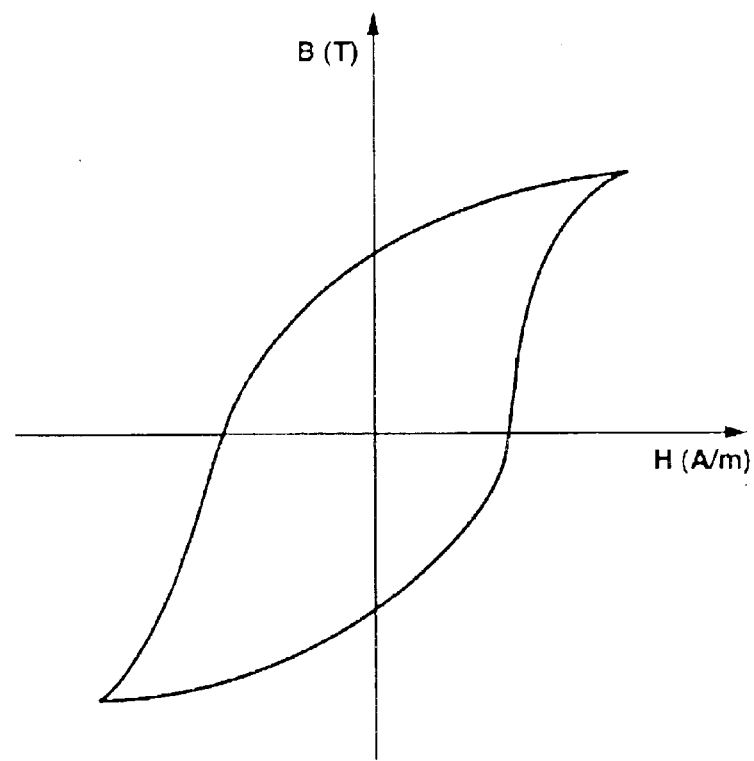
FIG. 5 is a graph showing the magnetic hysteresis loop of a hysteresis ring.
Figure 6:
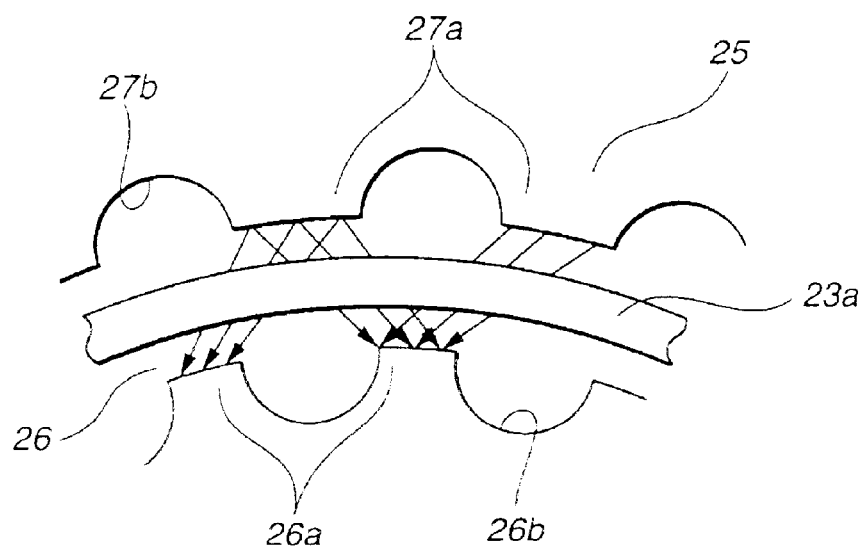
FIG. 6 is an enlarged view of part of FIG. 3.

More specifically, the hysteresis ring 23 is generally formed into a bottomed cylindrical shape, and has a retainer plate 22 coupled to a front end of the intermediate rotary member 18. At least the hysteresis portion 23a of the hysteresis ring 23 is made of a magnetically semi-hardened material (i.e. a hysteresis material) so as to impart the magnetic hysteresis characteristic to the hysteresis portion 23a. Herein, the magnetic hysteresis characteristic refers to the lagging of changes in magnetic flux density B (T) behind changes in magnetic field as the external magnetic field H (A/m) is varied, as shown in FIG. 5. The hysteresis portion 23a is formed into a cylindrical shape at an outer periphery of the hysteresis ring 23.

The coil yoke 25 is generally formed into a cylindrical shape, and circumferentially surrounds the coil 24. An inner periphery of the coil yoke 25 is mounted on the front end of the driven rotary member 7 via bearings 28 so as to allow rotation of the driven rotary member 7. The coil yoke 25 has at a rear side thereof a pair of circumferentially-opposed cylindrical surfaces 26 and 27 with a cylindrical air gap left between the opposed surfaces 26 and 27, and the hysteresis portion 23a of the hysteresis ring 23 is disposed in the air gap between the opposed surfaces 26 and 27 and held apart from the surfaces 26 and 27. The magnetic portion includes protrusions 26a and 27a formed the opposed surfaces 26 and 27 of the coil yoke 25, which serve as south poles and north poles, respectively. The protrusions 26a and 27a are arranged circumferentially in a staggered configuration. In the first embodiment, the opposed surfaces 26 and 27 of the coil yoke 25 have axially-extending, evenly-spaced recesses 26b and 27b formed therein to define the protrusions 26a and 27a by the spacing between adjacent recesses in such a manner that the protrusions 26a and 27a face the recesses 27b and 26b, respectively.

Upon energization, the coil 24 induces the magnetic field between each of protrusions 26a and adjacent one of the protrusions 27a. The direction of the magnetic field between the protrusions 26a and 27a is at an angle relative to the circumferential direction of the hysteresis ring 23 as indicated by arrows of FIG. 6.

The operation of the hysteresis brake 20 will be now explained with reference to FIGS. 7A and 7B.

Figure 7A:
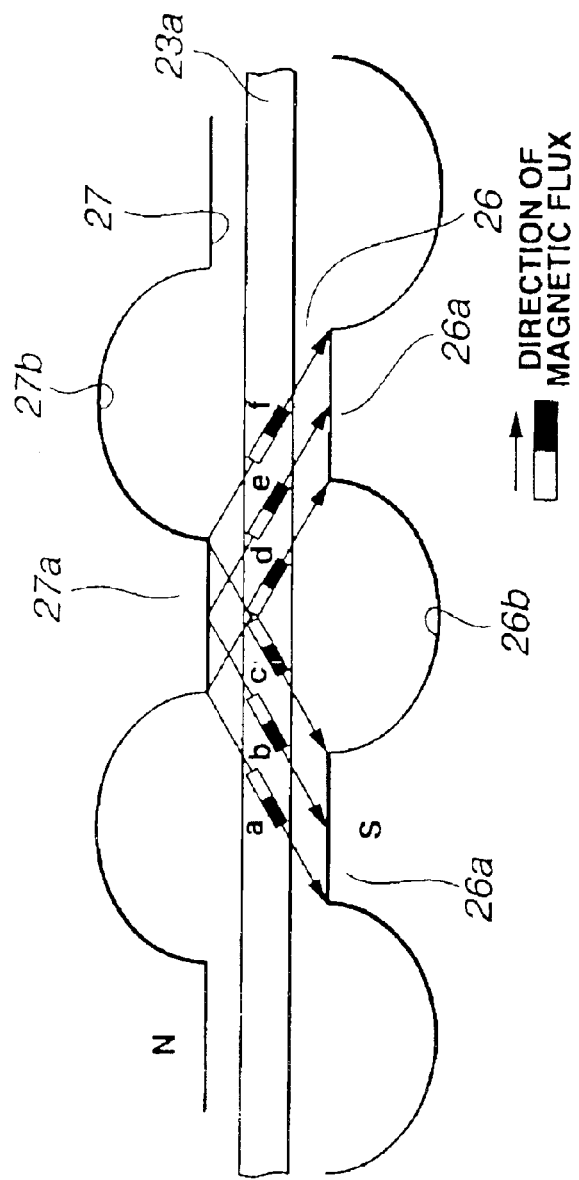
FIGS. 7A and 7B are schematic illustrations of how a hysteresis brake generates a braking force.
Figure 7B:
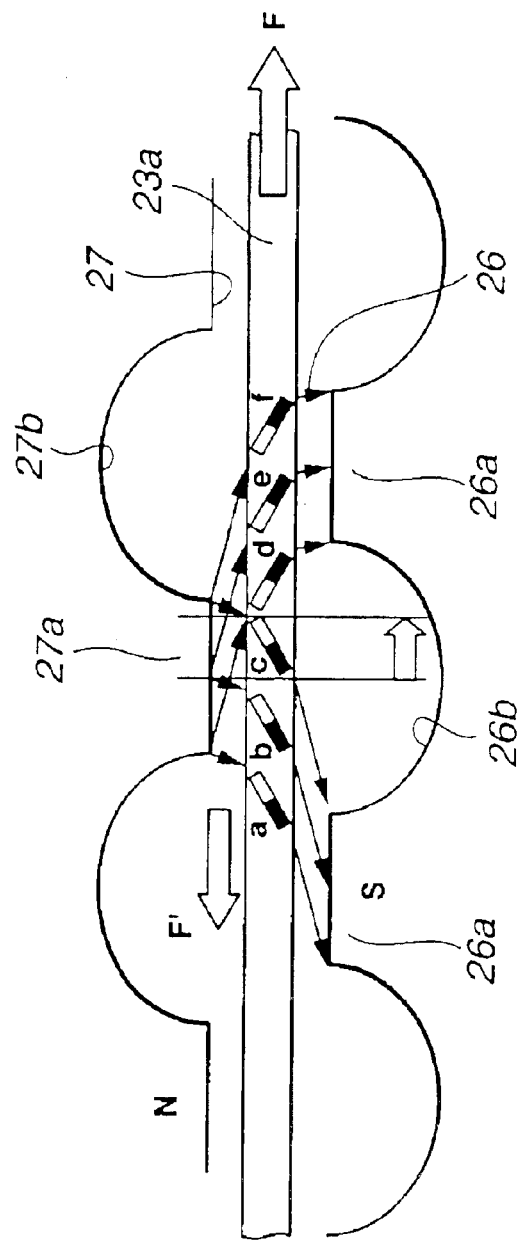

When the magnetic field is first provided across the hysteresis portion 23a as shown in FIG. 7A, there arises magnetic flux within the hysteresis portion 23a in the same direction as the magnetic field between the protrusions 26a and 27a. When the hysteresis ring 23 is rotated upon receipt of an external force F as shown in FIG. 7B, the hysteresis portion 23a shows its magnetic hysteresis characteristic by which the changes of magnetic flux within the hysteresis portion 23a lag behind the changes of the magnetic field between the protrusions 26a and 27a to cause a distortion in the magnetic field between the protrusions 26a and 27a. To cancel out such a distortion and align the magnetic field emerging from the protrusions 27a and entering the hysteresis portion 23a with the magnetic field emerging from the hysteresis portion 23a and entering the protrusions 26a, a braking force F' becomes developed against the force F so as to brake the rotation of the hysteresis ring 23. As the braking force is generated by the hysteresis brake 20 due to the lagging of the changes in magnetization of the hysteresis portion 23a behind the changes of the magnetic field between the protrusions 26a and 27a, the strength of the braking force is independent of the rotation speed of the hysteresis ring 23 (i.e. the relative speed between the hysteresis portion 23a and the protrusions 26a and 27a), but is generally proportional to the intensity of the magnetic field between the protrusions 26a and 27a (i.e. the amount of magnetizing current supplied to the coil 24).

Figure 8A:
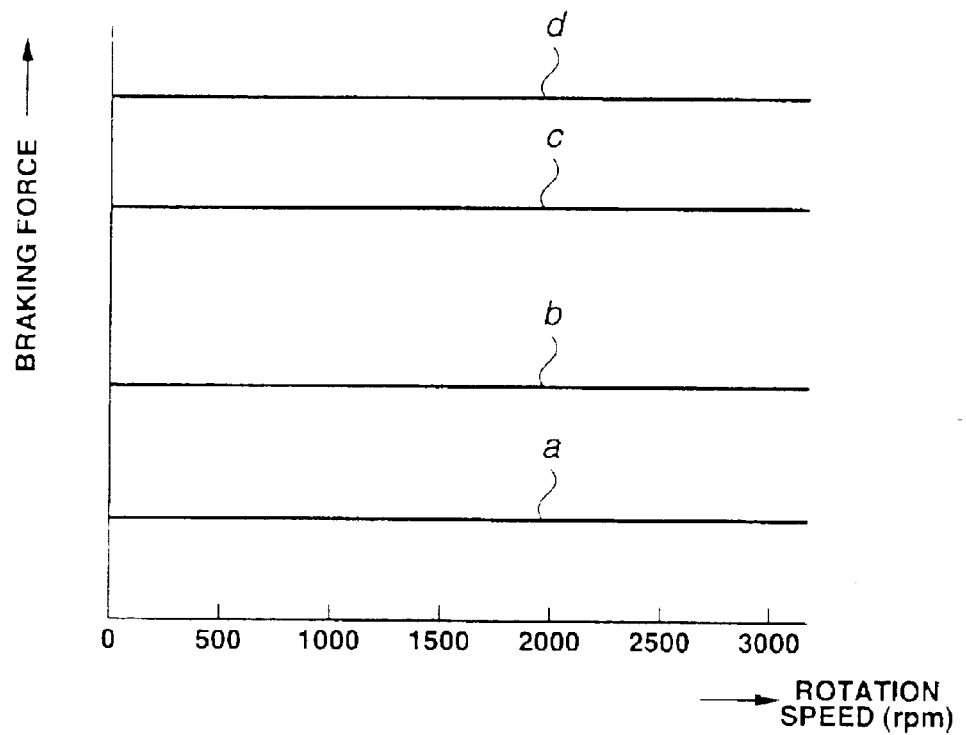
FIG. 8A is a graph showing the variations in braking force generated by the hysteresis brake.
Figure 8B:
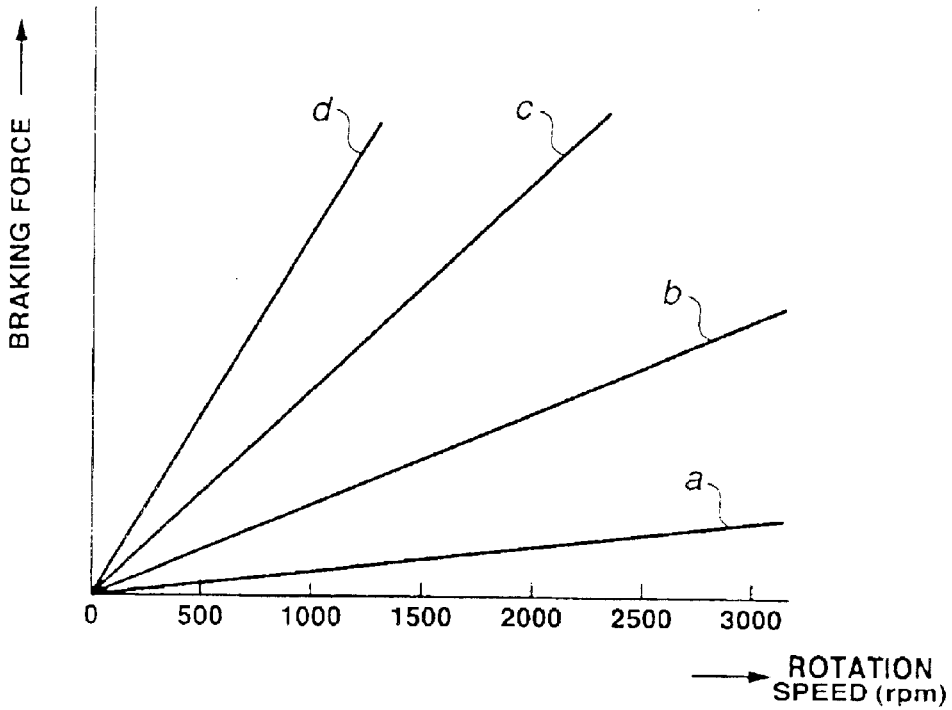
FIG. 8B is a graph showing the variations in braking force generated by an eddy-current brake.

The performance of the hysteresis brake 20 is now compared with that of an eddy-current brake through the application of magnetizing currents a, b, c and d (a<b<c<d). The braking force generated by the hysteresis brake 20 depends on the current supplied to the coil 24 and is unaffected by the rotation speed of the hysteresis ring 23 as shown in FIG. 8A, although the braking force generated by the eddy-current brake varies depending on the rotation speed of the corresponding rotary member as well as the current supplied to the coil as shown in FIG. 8B.

In the above structure, the valve timing control device operates as follows.

When the engine is started or runs at idle, the controller 35 causes the de-energization of the coil 24 so that the hysteresis ring 23 becomes free from the braking force. The intermediate rotary member 18 is rotated to the limit in the advancing direction with respect to the drive rotary member 3 under the tension of the spring 19, and then, the movable part is guided by the radial guide and the spiral guide to move in the radially outward direction, as shown in FIG. 2. Upon such a radially outward movement of the movable part, the link causes relative rotation between the drive and driven rotary members 3 and 7 to adjust the rotational phase between the drive and driven rotary members 3 and 7 (i.e. the rotational phase of the camshaft 1 relative to the crankshaft) to the most-retarded phase position. This allows the stabilization of engine operation and the improvement in fuel efficiency.

Figure 4:
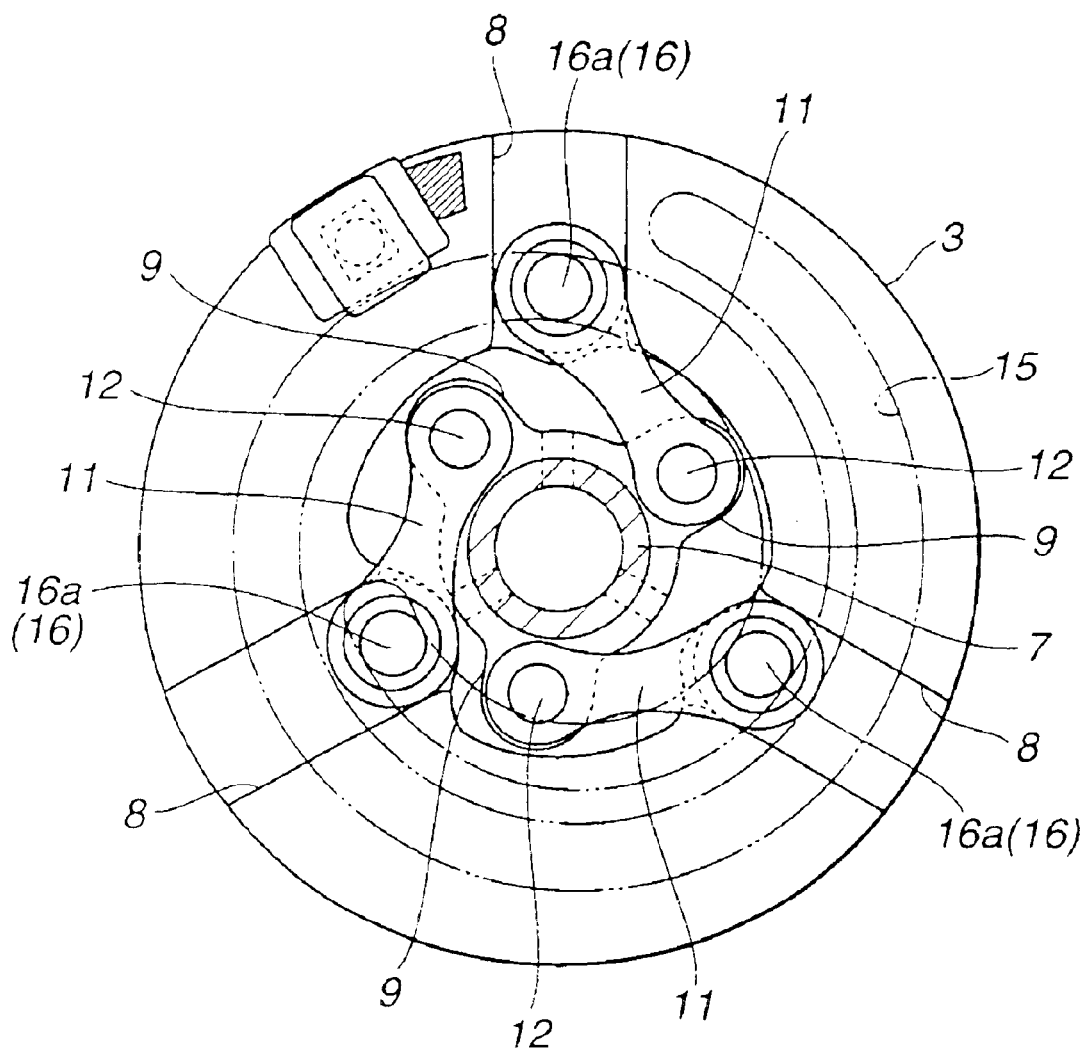
FIG. 4 is a sectional view of the valve timing control device, when taken along the line A—A of FIG. 1, under the condition that the rotational phase is shifted to a most-advanced phase position.

When the engine shifts to a normal operating mode, the controller 35 gives a command to adjust the rotational phase between the drive and driven rotary members 3 and 7 to the most-advanced phase position. The controller 35 causes the energization of the coil 24 so that the intermediate rotary member 18 receives the braking force through the hysteresis ring 23. As the braking force acts against the tension of the spring 19, the intermediate rotary member 18 is rotated in the retarding direction with respect to the drive rotary member 3. Then, the movable part is guided by the radial guide and the spiral guide to move in the radially inward direction, as shown in FIG. 4. Upon such a radially inward movement of the movable part, the link causes relative rotation between the drive and driven rotary members 3 and 7 to adjust the rotational phase between the drive and driven rotary members 3 and 7 (i.e. the rotational phase of the camshaft 1 relative to the crankshaft) to the most-advanced phase position. This allows high power generation of the engine.

To change the rotational phase from the most-advanced phase position to the most-retarded phase position, the controller 35 causes the de-energization of the coil 24. The intermediate rotary member 18 is rotated in the advancing direction under the tension of the spring 19. The movable part is guided by the radial guide and the spiral guide in the radially outward direction so that the link cause causes relative rotation between the drive and driven rotary members 3 and 7 to adjust the rotational phase between the drive and driven rotary members 3 and 7 to the most-retarded phase position.

The rotational phase between the drive and driven rotary members 3 and 7 is not limited to the most-retarded and most-advanced phase positions, and can be adjusted to a desired phase position by controlling the braking force generated by the hysteresis brake 20. The adjusted rotational phase can be held by the braking force generated by the hysteresis brake 20 to balance with the tension of the spring 19.

As described above, the hysteresis brake 20 is able to apply a sufficient braking force to the intermediate rotary member 18 without making friction contact between the intermediate rotary member 18 and the hysteresis ring 23. There is no fear of wear in the intermediate rotary member 18 and the hysteresis ring 23 even when the valve timing control device operates over a long period of time. It is therefore possible for the valve timing control device to maintain high accuracy of valve timing control and secure high reliability according to the first embodiment of the invention.

As the braking force is generated by the hysteresis brake 20 independently of the rotation speed of the hysteresis ring 23, the braking force generated by the hysteresis brake 20 is independent of the rotation speed of the intermediate rotary member 18. This makes it possible to apply a sufficiently large braking force to the intermediate rotary member 18 and allow the braking force to balance with a large tension of the spring 19, even when the rotation speed of the intermediate rotary member 18 is relatively low. The valve timing control device of the first embodiment becomes able to prevent its valve timing control response from being deteriorated when the engine rotates at a low speed and thereby attain immediate valve timing control in any engine speed range. The valve timing control device also becomes able to prevent the intermediate rotary member 18 from flapping under the influence of a large alternating torque of the camshaft 1 during the low-speed rotation of the engine and hold the rotational phase between the drive and driven rotary members 3 and 7 stably. As the braking force is generated proportionally to the magnetizing current supplied to the coil 24, the energization of the coil 24 can be controlled easily and accurately to adjust the braking force according to the engine operating condition.

Further, the hysteresis portion 23a of the hysteresis ring 23 is disposed in the air gap between the opposed cylindrical surfaces 26 and 27, and the coil 24 causes the magnetic field between the protrusions 26a and 27a formed on the opposed cylindrical surfaces 26 and 27 circumferentially in a staggered configuration. With such a simple structure, the magnetic field can be controlled more easily and accurately only by the energization and de-energization of the coil 24 than would be controlled by mechanical means. This makes it possible to attain a downsizing of the device as well as a reduction in manufacturing cost. This also makes it possible to keep the radial size of the hysteresis brake 20 small while allowing the hysteresis portion 23a to face the cylindrical surfaces 26 and 27 over a wide area, so as to promote the downsizing of the device.

In addition, the rotational phase control mechanism 4 has a low sliding resistance in the movable part to be guided by the radial and spiral guides through the use of the sliding elements (such as the pin 16 slidably engaged in the guide groove 15). As the rotational phase control mechanism 4 can be actuated with a relatively small actuation force, the actuation mechanism 5 can advantageously employ a smaller version of the hysteresis brake 20 to fit in a limited space on the engine.

Figure 9:
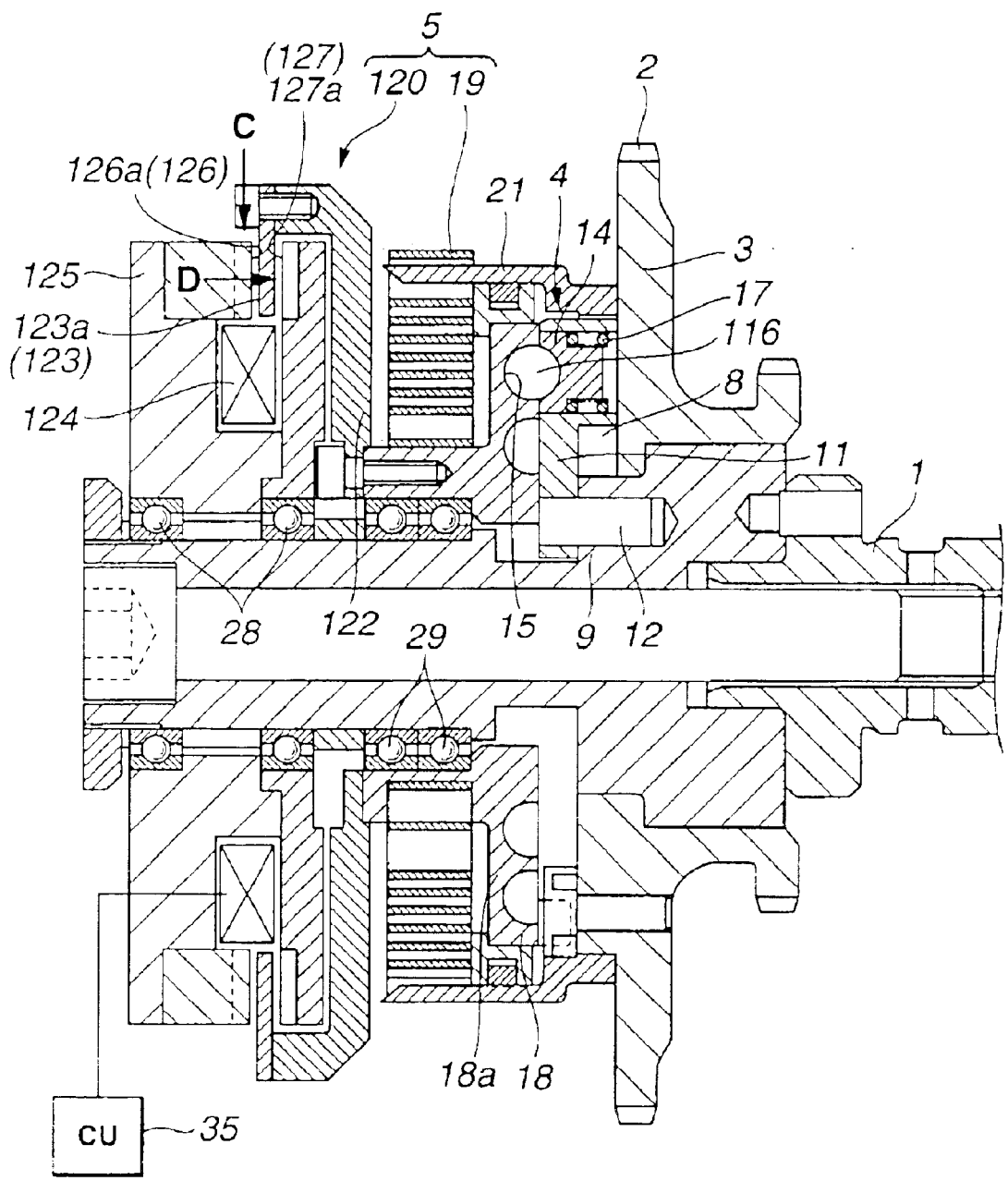
FIG. 9 is a sectional view of a valve timing control device according to a second embodiment of the present invention.
Figure 10:
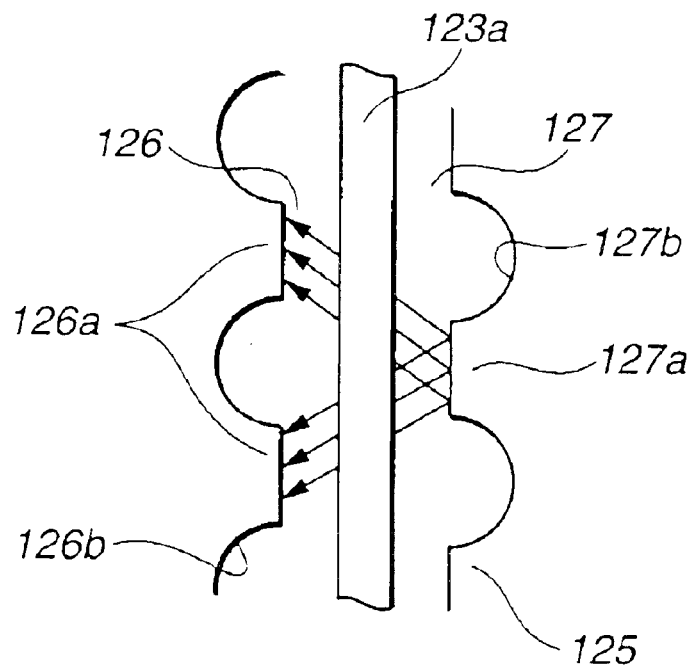
FIG. 10 is an enlarged sectional view of part of a hysteresis brake of the valve timing control device, when viewed in the direction of an arrow C of FIG. 9.
Figure 11:
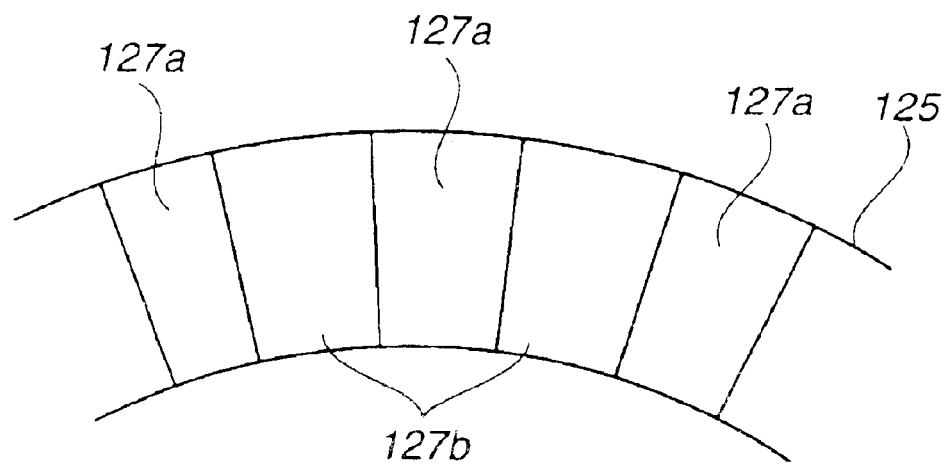
FIG. 11 is an enlarged plan view of part of a coil yoke of the hysteresis brake, when viewed in the direction of an arrow D of FIG. 9.
Figure 12:
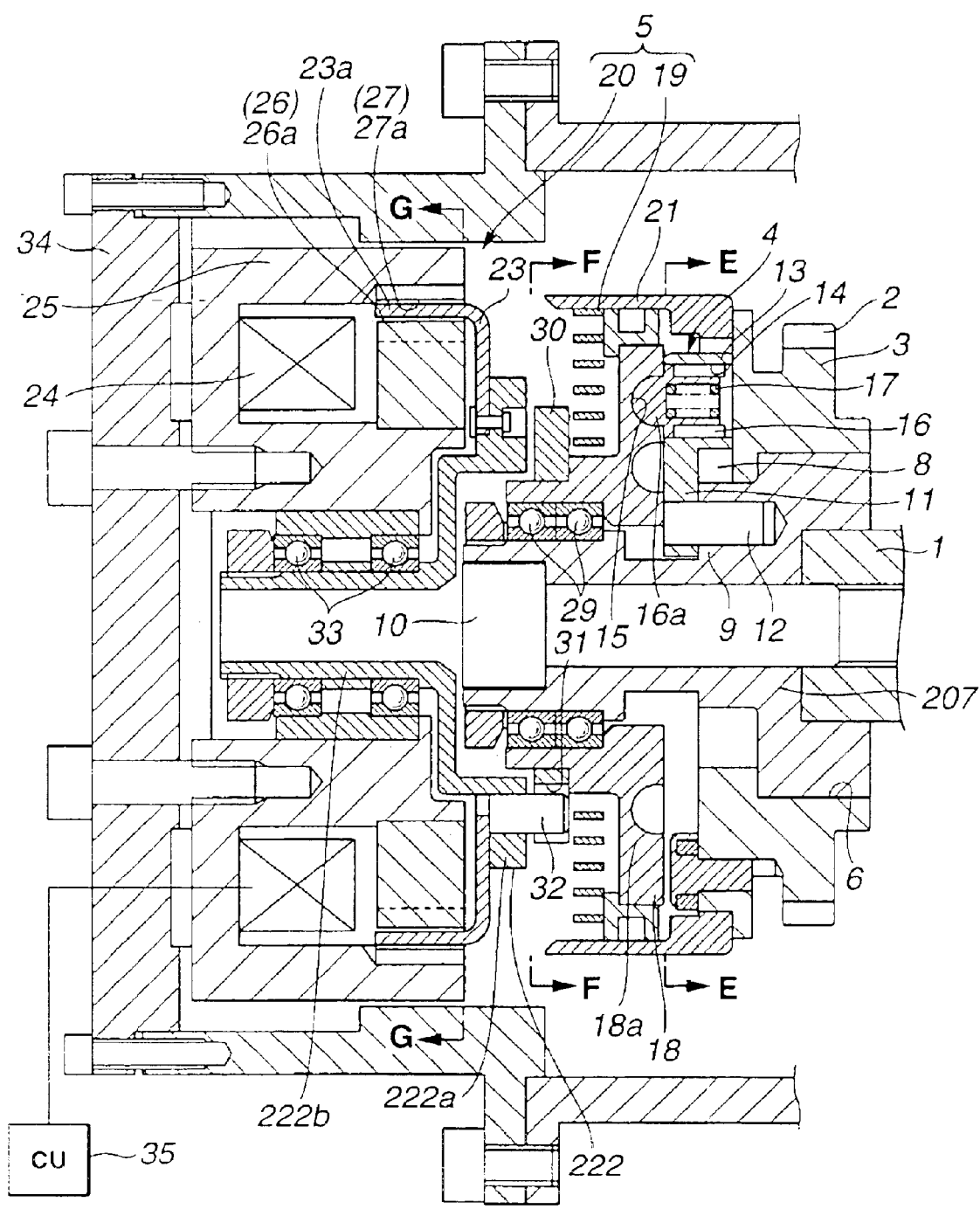
FIG. 12 is a sectional view of a valve timing control device according to a third embodiment of the present invention.
Figure 13:
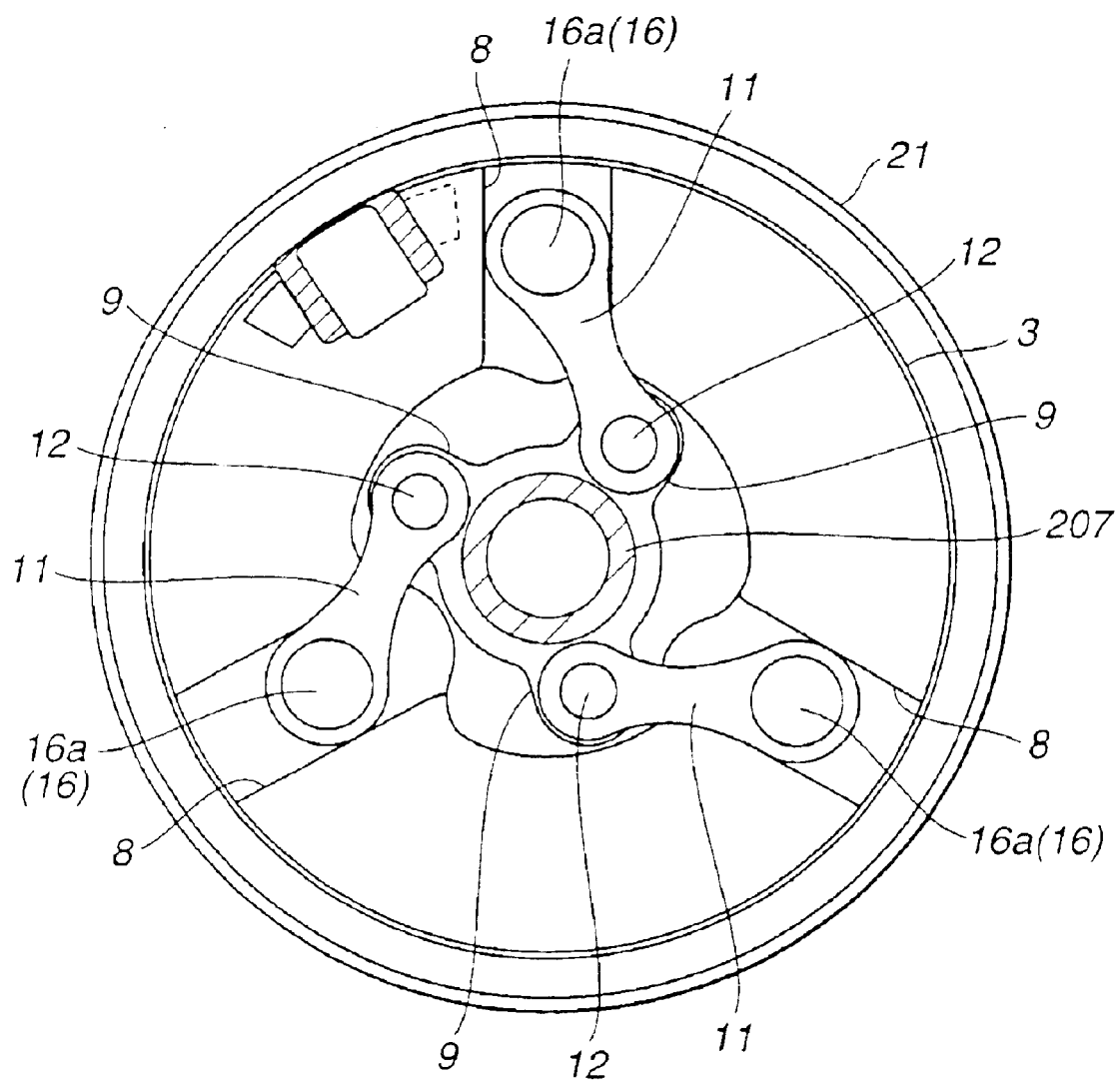
FIG. 13 is a sectional view of the valve timing control device, when taken along a line E—E of FIG. 12.
Figure 14:
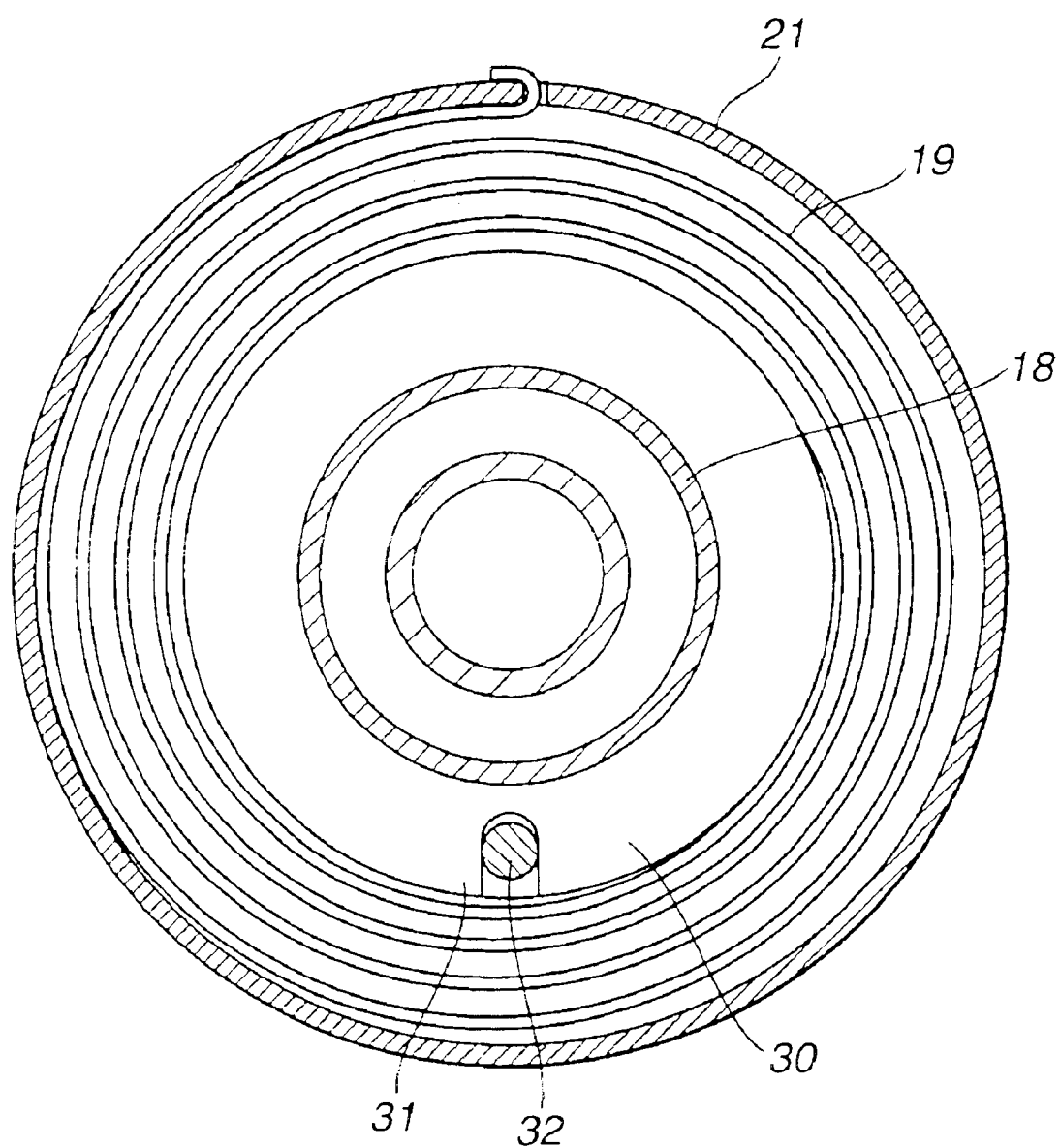
FIG. 14 is a sectional view of the valve timing control device, when taken along a line F—F of FIG. 12.
Figure 15:
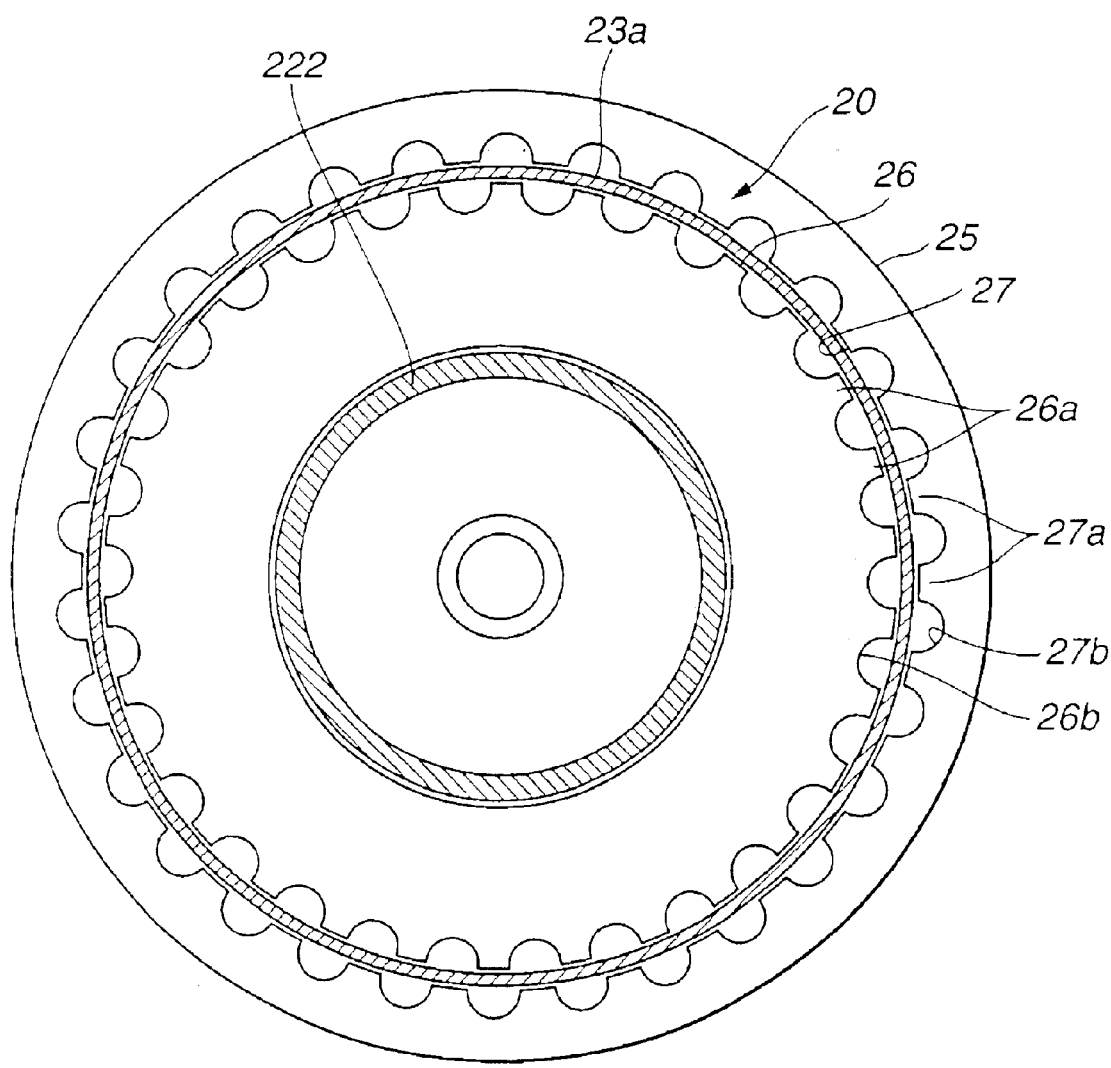
FIG. 15 is a sectional view of the valve timing control device, when taken along a line G—G of FIG. 12.

Next, a second embodiment of the present invention will be explained with reference to FIGS. 9 to 11.

A valve timing control device of the second embodiment is structurally similar to that of the first embodiment, except for a hysteresis brake 120 of the actuation mechanism 5. The hysteresis brake 120 comprises a hysteresis ring (as a first member) 123 provided with a disk-shaped hysteresis portion 123a, an electromagnetic coil (as a magnetic-field control unit) 124, and a coil yoke (as a second member) 125.

More specifically, the hysteresis ring 123 has a retainer plate 122 coupled to the intermediate rotary member 18 and shaped to extend along the rear side of the coil yoke 125. The retainer plate 122 is connected at an outer periphery thereof to the disk-shaped hysteresis portion 123a.

The coil 124 is arranged at the outer periphery of the coil yoke 125. The coil 124 and the coil yoke 125 are unrotatably held by the VCT cover (not shown), and an inner periphery of the coil yoke 125 is mounted on the front end of the driven rotary member 7 via the bearings 28 so as to allow rotation of the driven rotary member 7.

The coil yoke 125 has a pair of axially-opposed disk-shaped surfaces 126 and 127 with an air gap left between the opposed surfaces 126 and 127, and the disk-shaped hysteresis portion 123a of the hysteresis ring 123 is disposed in the air gap between the opposed surfaces 126 and 127 and held apart from the surfaces 126 and 127. As shown in FIGS. 10 and 11, the magnetic portion of the coil yoke 125 includes protrusions 126a and 127a formed on the opposed surfaces 126 and 127 of the coil yoke 125, which serve as south poles and north poles, respectively. The protrusions 126a and 127a are arranged circumferentially in a staggered configuration. In the second embodiment, the opposed disk-shaped surfaces 126 and 127 have radially-extending, evenly-spaced recesses 126b and 127b formed therein to define the protrusions 126a and 127a by the spacing between adjacent recesses in such a manner that the protrusions 126a and 127a face the recesses 127b and 126b, respectively.

Upon energization, the coil 124 induces the magnetic field between each of the protrusions 126a and adjacent one of the protrusions 127a. The direction of the magnetic field between the protrusions 126a and 127a is at an angle relative to the circumferential direction of the hysteresis ring 123, as indicated by arrows of FIG. 10.

In the above-described structure, the hysteresis brake 120 generates a braking force in the same manner as the hysteresis brake 20 so that the braking force is exerted on the intermediate rotary member 18 through the hysteresis ring 123.

Further, the movable part of the rotational phase control mechanism 4 has a ball 116 (as a sliding/rolling element) slidably engaged in the spiral groove 15.

The valve timing control device of the second embodiment can provide substantially the same effects as those of the first embodiment. With the disk-shaped hysteresis portion 123a of the hysteresis ring 123 disposed in the air gap between the axially-opposed disk-shaped surfaces 126 and 127 of the coil yoke 125, it becomes additionally possible to make the hysteresis brake 120 axially shorter in length and thereby reduce the axial length of the device. Herein, the braking torque acting upon the hysteresis ring 123 depends on the braking force generated and the distance from the rotation axis. As the hysteresis ring 123 is arranged in such a manner that the hysteresis portion 123a extends radially outwardly, the braking torque can be increased easily and imparted to the intermediate rotary member 18 efficiently.

A third embodiment of the present invention will be explained with reference to FIGS. 12 to 15.

A valve timing control device of the third embodiment is structurally similar to that of the first embodiment, except for the coupling between the hysteresis ring 23 and the intermediate rotary member 18 as well as the support for the hysteresis ring 23.

More specifically, a driven rotary member 207 is made shorter in length than the driven rotary member 7, so as not to be located within an inner periphery of the coil 24. The intermediate rotary member 18 has a flange ring 30 formed integral with a front end of the base portion of the intermediate rotary member 18 so as to extend radially outwardly. The coil yoke 25 is fixed to a stationary part of the device (in the third embodiment, a VCT cover 34). Further, the hysteresis ring 23 has a retainer plate 222 fixed at one end thereof to the hysteresis portion 23a. The retainer plate 222 includes a thick plate portion 222a and a cylindrical portion 222b extending from the plate portion 222a to have a stepwisely reduced diameter. The cylindrical portion 222b of the retainer plate of the hysteresis ring 23 is rotatably supported on an inner periphery of the coil yoke 25 by radial roller bearings 33. Alternatively, the cylindrical portion 222b can be supported by the bearings 33 on the VCT cover 34 or the other stationary part of the device.

Either one of the flange ring 30 and the retainer plate 222 has a groove 31 formed radially, and the other of the flange ring 30 and the retainer plate 222 has a protrusion 32 formed slidably engaged in the groove 31. In the third embodiment, the groove 31 is formed through the flange ring 30 to extend radially, and the protrusion 32 is formed on the plate portion 222a of the retainer plate 222. The slidable engagement of the protrusion 32 in the groove 31 allows radial displacement of the intermediate rotary member 18 relative to the hysteresis ring 23, but prevents relative rotation between the intermediate rotary member 18 and the hysteresis ring 23.

The valve timing control device of the third embodiment can provide substantially the same effects as those of the first embodiment. Herein, the intermediate rotary member 18 may be radially shifted due to the radial swinging of the camshaft 1 during the engine operation. However, the engagement of the groove 31 and the protrusion 32 allows radial displacement of the intermediate rotary member 18 relative to the hysteresis ring 23 but prevents relative rotation between the intermediate rotary member 18 and the hysteresis ring 23. It becomes therefore possible to accommodate a radial shift of the intermediate rotary member 18 by the engagement of the groove 31 and the protrusion 32 and thereby prevent the hysteresis ring 23 from being effected by the radial shift of the intermediate rotary member 18. With the hysteresis ring 23 supported on the coil yoke 25 via the bearings 33, it becomes further possible to keep some clearance between the hysteresis portion 23a and the projections 26a and 27a of the opposed cylindrical surfaces 26 and 27 by arranging the hysteresis ring 23 concentrically with the coil yoke 25, so as to constantly stabilize the magnetization of the hysteresis portion 23a.

Although the above-described structure of coupling the intermediate rotary member 18 and the hysteresis ring 23 and supporting the hysteresis ring 23 is used to modify the first embodiment, it can be applied to the other embodiment of the invention.

Figure 16:
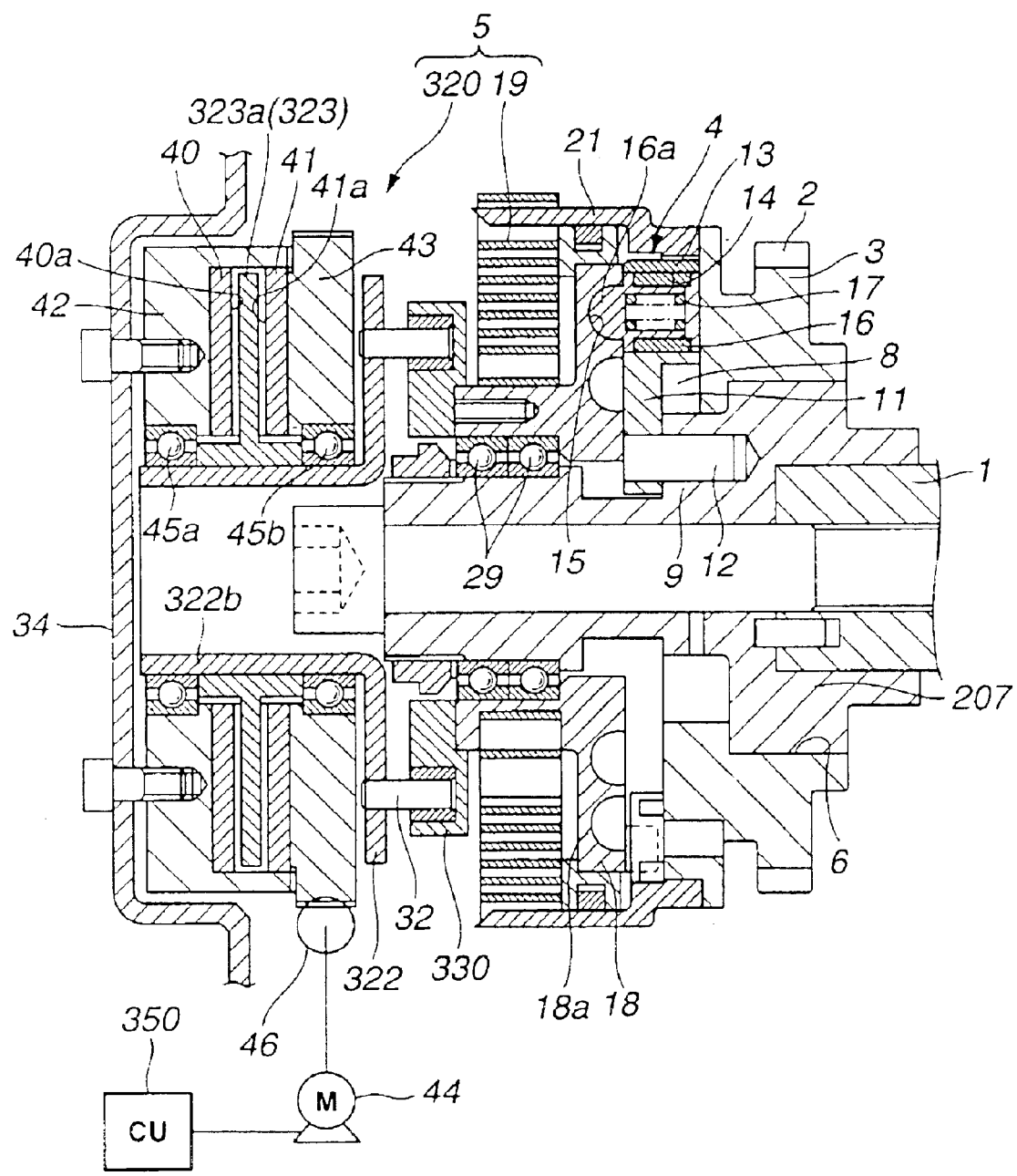
FIG. 16 is a sectional view of a valve timing control device according to a fourth embodiment of the present invention.

Finally, a fourth embodiment of the present invention will be explained with reference to FIG. 16.

A valve timing control device of the fourth embodiment is structurally similar to those of the first and third embodiments, except for a hysteresis brake 320 of the actuation mechanism 5. The hysteresis brake 320 comprises a hysteresis ring (as a first member) 323 provided with an annular flat hysteresis portion 323a, a pair of annular permanent-magnet blocks (as a second member) 40 and 41 axially opposed to each other, and a rotation member (as a magnetic-field control unit) that cause relative rotation between the permanent-magnet blocks 40 and 41 to control a magnetic field generated between the permanent-magnet blocks 40 and 41.

More specifically, at least the hysteresis portion 323a of the hysteresis ring 323 is made of a magnetically semi-hardened material to exhibit a magnetic hysteresis characteristic as in the other embodiments.

The permanent-magnet blocks 40 and 41 have pole faces 40a and 41a, relatively, with an air gap left between the pole faces 40a and 41a, and the hysteresis portion 323a of the hysteresis ring 323 is disposed in the air gap between the pole faces 40a and 41a and held away from the pole faces 40a and 41a. The pole faces 40a and 41a are of opposite polarity and circumferentially displaced from each other to adjust the magnetic field generated between the pole faces 40a and 41a.

The rotation member includes a fixed base block 42 fixed unrotatably to the VCT cover 34 to support the permanent-magnet block 40 as one unit, a movable base block 43 that supports the permanent-magnet block 41 as one unit, a motor 44 to rotate the base block 43 relative to the base block 42, a worm gear 46 by which an outer periphery of the base block 43 is linked to the motor 44 and a controller 350 that controls the operation of the motor 44. Both of the base blocks 42 and 43 are ring-shaped so that the cylindrical portion 322b of the retainer plate 322 extends through the base blocks 42 and 43. An inner periphery of the base block 42 supports thereon a front end of the cylindrical portion 322b of the retainer plate 322 via a bearing 451a, and an inner periphery of the base block 43 is supported on the cylindrical portion 322b of the retainer plate 322 via a bearing 45b.

When the motor 44 is driven at the command from the controller 350, the base block 43 is rotated relative to the base block 42 to cause relative rotation between the permanent-magnet blocks 40 and 41 so as to control the magnetic field between the pole faces 40a and 41a and across the hysteresis ring 323. Then, the hysteresis brake 320 generates a braking force in the same manner as the hysteresis brakes 20.

The valve timing control device of the fourth embodiment can provide substantially the same effects as those of the first to third embodiments, as described above. In addition to that, the use of the permanent-magnet blocks 40 and 41 enables low power consumption without the need to energize the electromagnetic coil 24 or 124 to generate the magnetic field as in the other embodiments.

Although the present invention has been described with reference to specific embodiments of the invention, the invention is not limited to the above-described embodiments. Various modification and variation of the embodiment described above will occur to those skilled in the art in light of the above teaching. The scope of the invention is defined with reference to the following claims.

What is claimed is:

1. A valve timing control device for an internal combustion engine, comprising:
   a drive rotary member rotated by a crankshaft of the engine;
   a driven rotary member to rotate a camshaft of the engine upon rotation of the drive rotary member;
   a rotational phase control mechanism having an intermediate rotary member rotated relative to the drive and driven rotary members to cause relative rotation between the drive and driven rotary members; and
   a braking mechanism having a hysteresis brake that generates a braking force to cause the intermediate rotary member to rotate relative to the drive and driven rotary members,
   the hysteresis brake including:
      a first member having a hysteresis portion with a magnetic hysteresis characteristic;
      a second member having a magnetic portion to provide a magnetic field across the hysteresis portion; and
      a magnetic-field control unit that controls the magnetic field,
      the first and second members being movable relative to each other to produce the braking force due to the magnetic hysteresis characteristic of the hysteresis portion relative to the magnetic field generated from the magnetic portion.

2. The valve timing control device according to claim 1,
   the second member having a pair of first and second surfaces opposed to each other with an air gap left between the first and second surfaces, the magnetic portion including first and second protrusions formed on the first and second surfaces, respectively, to be arranged circumferentially in a staggered configuration,
   the magnetic-field control unit comprising an electromagnetic coil that, when energized, causes the magnetic field between each of the first protrusions and adjacent one of the second protrusions, and
   the first member being a hysteresis ring having the hysteresis portion disposed in the air gap between the first and second surfaces.

3. The valve timing control device according to claim 2, wherein the first and second surfaces are cylindrical-shaped, and the hysteresis portion is cylindrical-shaped and disposed in the air gap between the first and second surfaces.

4. The valve timing control device according to claim 3,
   the second member being held by a stationary part of the device,
   the valve timing control device further comprising a bearing by which the hysteresis ring is rotatably supported on either the second member or the stationary part of the device, and
   the hysteresis ring being coupled to the intermediate rotary member in such a manner as to allow radial displacement of the intermediate rotary member relative to the hysteresis ring but prevent relative rotation between the intermediate rotary member and the hysteresis ring.

5. The valve timing control device according to claim 4, wherein either one of the intermediate rotary member and the hysteresis ring defines therein a radial groove, and the other of the intermediate rotary member and the hysteresis ring has a protrusion formed thereon to be slidably engaged in the groove for the radial displacement of the intermediate rotary member relative to the hysteresis ring.

6. The valve timing control device according to claim 2, wherein the first and second surfaces are disk-shaped, and the hysteresis portion is disk-shaped and disposed in the air gap between the first and second surfaces.

7. The valve timing control device according to claim 6,
   the second member being held to a stationary part of the device,
   the valve timing control device further comprising a bearing by which the hysteresis ring is rotatably supported on either the second member or the stationary part of the device, and
   the hysteresis ring being coupled to the intermediate rotary member in such a manner as to allow radial displacement of the intermediate rotary member relative to the hysteresis ring but prevent relative rotation between the intermediate rotary member and the hysteresis ring.

8. The valve timing control device according to claim 7, wherein either one of the intermediate rotary member and the hysteresis ring defines therein a radial groove, and the other of the intermediate rotary member and the hysteresis ring has a protrusion formed thereon to be slidably engaged in the groove for the radial displacement of the intermediate rotary member relative to the hysteresis ring.

9. The valve timing control device according to claim 1, wherein the braking mechanism further comprises a spring that provides a spring tension against the braking force, and the hysteresis brake adjusts the braking force in such a manner that the braking force balances with the spring tension to lock the intermediate rotary member and thereby hold a rotational phase between the drive and driven rotary members.

10. The valve timing control device according to claim 1,
    the second member comprising a pair of permanent magnets, the magnetic portion including pole faces formed on the permanent magnets, respectively, to be opposite in polarity, the pole faces being opposed to each other to define an air gap between the pole faces,
    the magnetic-field control unit comprising a rotation member that causes relative rotation between the permanent magnets to generate the magnetic field between the pole faces, and
    the hysteresis member being a hysteresis ring having the hysteresis portion disposed in the air gap between the pole faces.

11. A valve timing control device for an internal combustion engine, comprising:
    a drive rotary member rotated by a crankshaft of the engine;
    a driven rotary member to rotate a camshaft of the engine upon rotation of the drive rotary member;
    a rotational phase control mechanism having an intermediate rotary member rotated relative to the drive and driven rotary members to cause relative rotation between the drive and driven rotary members; and
    a braking mechanism having a hysteresis brake that generates a braking force to cause the intermediate rotary member to rotate relative to the drive and driven rotary members,
    the drive and driven rotary members and the intermediate rotary member being arranged concentrically to be rotatable about a given axis relative to one another, and the rotational phase control mechanism further comprising:
- a radial guide provided on either one of the drive and driven rotary members;
- a spiral guide provided on the intermediate rotary member;
- a movable part guided by the radial guide and the spiral guide in a radial direction with respect to the given axis upon rotation of the intermediate rotary member relative to the drive and driven rotary members, the movable part having a sliding element slidably engaged in the spiral guide; and
- a link that links the movable part to the other of the drive and driven rotary members to change a rotational phase between the drive and driven rotary members according to radial movement of the movable part, the link having a lever connected to the other of the drive and driven rotary members at a position away from the given axis.

12. A valve timing control device for an internal combustion engine, comprising:
- a drive rotary member rotated by a crankshaft of the engine;
- a driven rotary member to rotate a camshaft of the engine;
- an intermediate rotary member rotated relative to the drive and driven rotary members to cause relative rotation between the drive and driven rotary members;
- biasing means for biasing the intermediate rotary member in a given rotation direction;
- a hysteresis brake that selectively applies a braking force to the intermediate rotary member to force the intermediate rotary member in a direction opposite to the given rotation direction,
- the hysteresis brake including:
  - a first member having a hysteresis portion with a magnetic hysteresis characteristic, the hysteresis portion being coupled to the intermediate rotary member;
  - a second member having a magnetic portion to provide a magnetic-field across the hysteresis portion; and
  - a magnetic-field control unit that controls the magnetic field,
  - the first and second members being movable relative to each other so that the hysteresis portion shows the magnetic hysteresis characteristics relative to the magnetic field generated from the magnetic portion to impart the braking force to the intermediate rotary member.

13. The valve timing control device according to claim 12, the second member having a pair of opposed surfaces with an air gap left between the opposed surfaces, the magnetic portion including evenly-spaced recesses formed in the opposed surfaces, respectively, to define north and south poles by the spacing between adjacent recesses so that the north and south poles face the recesses formed in the opposed surfaces,
the magnetic-field control unit comprising an electromagnetic coil that, when energized, generates the magnetic field between adjacent north and south poles, and
the first member being a hysteresis ring having the hysteresis portion disposed in the air gap and held apart from the opposed surfaces.

14. The valve timing control device according to claim 13, wherein the hysteresis brake adjusts the brake according to an amount of magnetizing current supplied to the coil.

15. The valve timing control device according to claim 13, the second member being held to a stationary part of the device,
the valve timing control device further comprising:
- a first bearing by which the intermediate rotary member is rotatably supported on the driven rotary member; and
- a second bearing by which the hysteresis ring is rotatably supported on either the second member or the stationary part of the device, and
- the intermediate rotary member and the hysteresis ring being concentrically coupled to each other in such a manner as to allow radial displacement of the intermediate rotary member relative to the hysteresis ring but prevent relative rotation between the intermediate rotary member and the hysteresis ring.

16. The valve timing control device according to claim 15, wherein either one of the intermediate rotary member and the hysteresis ring defines therein a radial groove, and the other of the intermediate rotary member and the hysteresis ring has a protrusion formed thereon to be slidably engaged in the groove for the radial displacement of the intermediate rotary member relative to the hysteresis ring.

17. The valve timing control device according to claim 12, the drive and driven rotary members and the intermediate rotary member being arranged concentrically to be rotatable about a given axis relative to one another, and
the timing valve timing control device further comprising a rotational phase control mechanism having:
- a radial guide provided on either one of the drive and driven rotary members;
- a spiral guide provided on the intermediate rotary member;
- a movable part guided by the radial guide and the spiral guide in a radial direction with respect to the given axis upon rotation of the intermediate rotary member relative to the drive and driven rotary members, the movable part having a sliding element slidably engaged in the spiral guide; and
- a link that links the movable part to the other of the drive and driven rotary members to change a rotational phase between the drive and driven rotary members according to radial movement of the movable part, the link having a lever connected to the other of the drive and driven rotary members at a position away from the given axis.

18. The valve timing control device according to claim 12,
the second member comprising a pair of permanent magnets, the magnetic portion including pole faces formed on the permanent magnets, respectively, to be opposite in polarity, the pole faces being opposed to each other to define an air gap between the pole faces,
the magnetic-field control unit comprising a rotation member that causes a relative rotation between the permanent magnets to induce the magnetic field between the pole faces, and
the first member being a hysteresis ring having the hysteresis portion disposed in the air gap between the pole faces and held apart from the pole faces.

* * * * *